Aug. 9, 1955  H. S. PEAK  2,714,777
FISHING LURE RETRIEVER
Filed July 25, 1952
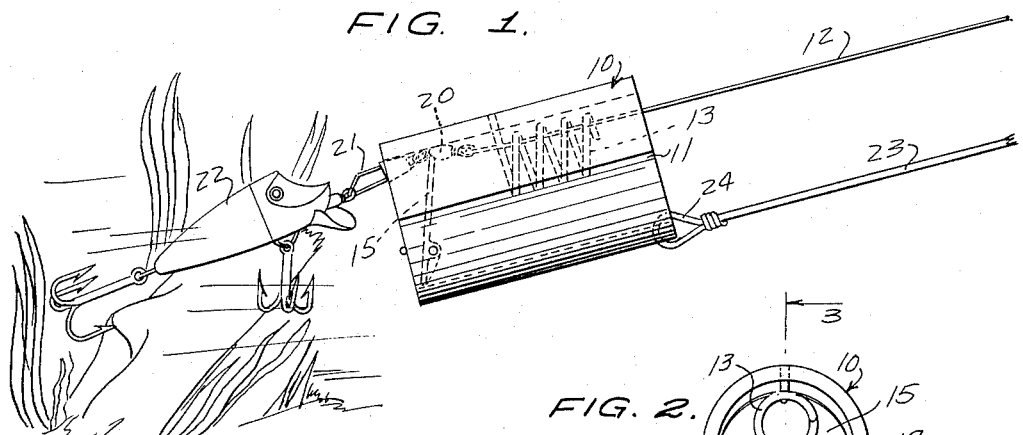
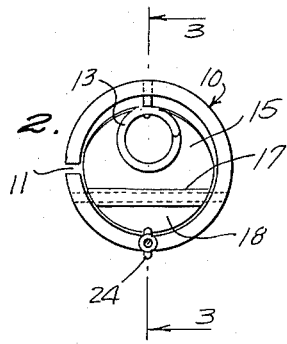
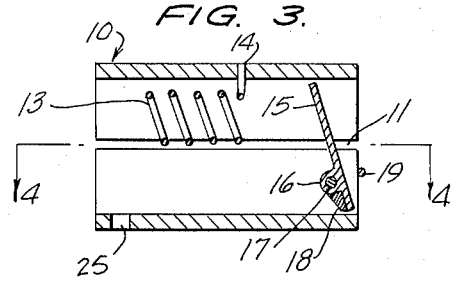
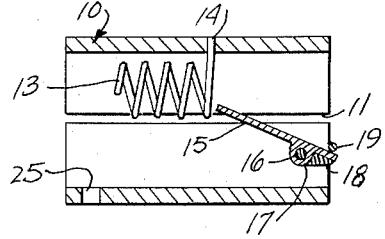
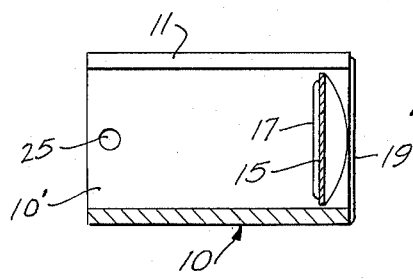
INVENTOR.
HAROLD S PEAK,
BY
McMorrow, Berman + Davidson
ATTORNEYS.

United States Patent Office 2,714,777
Patented Aug. 9, 1955

2,714,777

FISHING LURE RETRIEVER

Harold S. Peak, Burbank, Calif.

Application July 25, 1952, Serial No. 300,801

5 Claims. (Cl. 43—17.2)

This invention relates to fishing lure retrievers and more particularly to a retriever which can be slidably mounted on a fishing line and put into engagement with a fouled fishing lure and has a cord attached thereto for pulling the lure free from an underwater obstacle with which the lure may have become engaged.

It is among the objects of the invention to provide an improved fishing lure retriever which includes a heavy body which can be slidably mounted on a fishing line for movement down the line to a fouled lure, and a strong cord secured to the retriever body for applying a pull of sufficient force to the retriever to disengage a fouled lure from an underwater obstacle to which the lure has become attached; which will not engage the fishing line or the leader by which the lure is attached to the line but will engage only with the lure itself or with the snap hook or swivel connector attached directly to the lure; and which is simple and durable in construction, economical to manufacture, easy to use, and positive and effective in use.

Other objects and advantages will become apparent from a consideration of the following description and the appended claims in conjunction with the accompanying drawing wherein:

Figure 1 is a side elevational view of a lure retriever illustrative of the invention shown in operative association with a fishing line and a fouled fishing lure attached to the line;

Figure 2 is an end elevational view of the retriever;

Figure 3 is a longitudinal cross sectional view on the line 3—3 of Figure 2;

Figure 4 is a longitudinal cross sectional view on the line 4—4 of Figure 3; and Figure 5 is a longitudinal cross sectional view similar to Figure 3 but showing a movable part of the retriever in a different operative position from that illustrated in Figure 3.

With continued reference to the drawing, the illustrated retriever comprises a tubular, preferably cylindrical body 10 of heavy material, such as metal. The use of the term "heavy body" hereinafter is to be taken as indicating a non-buoyant body which will sink readily in water.

The body 10 has open ends and has a side wall 10' provided with slot 11 extending longitudinally thereof from one end to the other and through which a fishing line 12 can be passed from the exterior to the interior of the body.

A line guide 13 is disposed in the body and comprises a helical coil of wire having one end portion extending tangentially therefrom and secured in an aperture in the body 10 at a location spaced from the slot 11, as indicated at 14 so that the guide is secured at one end to the retriever body intermediate the length of the latter and extends longitudinally of the interior of the body in spaced relation to the side wall of the body. After the fishing line has been moved into the body 10 through the slot 11 it can be rotated around the guide 13 in a manner to dispose the line entirely within the guide and the guide will then maintain the line within the body and prevent the retriever from leaving the line by passage of the line out of the retriever through the slot 11.

A flat, disc shape door 15 is disposed within the body 10 near one end of the body and extends transversely of the bore or interior of the body. This door is pivotally connected to the body by pivot pin 16 which extends chordwise of the circular cross sectional area of the body at a location spaced from the longitudinal center line of the body and spaced from the side wall of the body. The door 15 is provided with a sleeve formation 17 which rotatably receives the pin 16 and the door 15 extends a greater distance to one side of the sleeve formation 17 than to the other side of this formation. The short side of the door is weighted, as indicated at 18, and this weight is spaced from the line guide 13 in a manner such that when the body 10 is supported on a line passing through the line guide, the weight 18 tends to move the door 15 in a direction to substantially close the bore or interior of the body.

A bar 19 extends transversely across the end of the body near which the door 15 is disposed and engages the short side of the door to stop the door in a position relative to the body in which the door is inclined from the pivot pin 16 toward the line guide 13 and the end of the body 10 remote from the door, as illustrated in Figure 5. In this position of the door the swivel connector 20 or the snap hook 21, or both the swivel connector and the snap hook attached to the lure 22 can pass the door and enter the interior of the body 10. Where the lure is of very small size, it is also possible that the forward portion of the lure will pass the door and enter the body adjacent the line guide 13.

In using the retriever to release a fouled lure, the fishing line 12 is passed through the slot 11 from the outside to the inside of the body 10 and is then wound into the spiral line guide 13. A strong cord 23 is attached to the retriever by having a loop 24 threaded through an aperture 25 in the body 10 at the end of the body remote from the door 15 and at the side of the body remote from the line guide 13 and, after the fishing line has been threaded into the guide 13 the body 10 is permitted to slide downwardly along the line 12 toward the lure 22. If the retriever stops short of the lure, its movement down the line can be continued by shaking or jerking the line. As the retriever approaches the lure, the door 15 will be in the open position illustrated in Figure 5 by virtue of the line 12 bearing against the top edge thereof, the door being at the end of the retriever body nearest the lure. As the body 10 approaches the lure, the swivel connector 20 and snap hook 21 connected directly to the lure will pass the door 15 into the interior of the body 10. A short pull on the cord 23 will then tend to pull the retriever body upwardly along the line and flow of water through the body 10 in the opposite direction will move the door toward its closed position, as illustrated in Figure 1, in which position the edge of the body 10 furthest from the pivot pin 16 will engage the snap hook 21 or the swivel connector 20 of the lure and bind the swivel connector or snap hook between the edge of the door and the adjacent portion of the inner surface of the body 10, as illustrated in Figure 1, providing a firm grip on the swivel connector or snap hook. A pull of sufficient force may now be exerted on the pull cord 23 to detach the lure from the underwater obstacle to which it has become attached and free the lure so that it can be brought to the surface of the water for reuse.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a fishing lure retriever, an open-ended non-buoyant tubular body having a forward end and a rearward end, and a side wall, a helical line guide within said body, said guide being secured at one end to said side wall and being spaced from said side wall, and lure engaging means on said body within the forward end thereof.

2. In a retriever for a fishing lure and line, an open-ended non-buoyant tubular body having a side wall and forward and rearward ends, said body being arranged to slidably receive a fishing line therethrough and to engage over a snagged lure on such line, an eccentric longitudinal line guide within said body comprising a helical coil secured at one end only to said side wall, said guide coil having a forward end spaced from the forward end of the body, and gravity actuated lure engaging means mounted within the forward end of the body.

3. In a retriever for a fishing lure and line, an open-ended non-buoyant tubular body having a side wall and forward and rearward ends, said body being arranged to slidably receive a fishing line therethrough and to engage over a snagged lure on such line, a longitudinal line guide eccentrically mounted within said body comprising a helical coil secured at one end only to said side wall, said guide coil having a forward end spaced from the forward end of the body, and gravity actuated lure engaging means mounted within the forward end of the body, said lure engaging means comprising a door pivoted in said body, and weight means on said door at one side of its pivotal axis serving to overbalance the door rearwardly into the body to operative position, said door having a free edge at the opposite side of its pivotal axis arranged to jam a lure between said free edge and the body side wall in another position of the door.

4. In a retriever for a fishing lure and line, an open-ended non-buoyant tubular body having a side wall and forward and rearward ends, said body being arranged to slidably receive a fishing line therethrough and to engage over a snagged lure on such line, a longitudinal line guide eccentrically mounted within said body comprising a helical coil secured at one end only to said side wall, said guide coil having a forward end spaced from the forward end of the body, and gravity actuated lure engaging means mounted within the forward end of the body, said lure engaging means comprising a door pivoted in said body, and weight means on said door at one side of its pivotal axis serving to overbalance the door rearwardly into the body to operative position, said door having a free edge at the opposite side of its pivotal axis arranged to jam a lure between said free edge and the body side wall in another position of the door, said guide being more greatly spaced from said side wall at one side of said body and more closely spaced to an opposite side of said body, and said free edge of the door being located nearer to said opposite side of the body than to said one side of the body.

5. In a retriever for a fishing lure and line, an open-ended non-buoyant tubular body having a side wall and forward and rearward ends, said body being arranged to slidably receive a fishing line therethrough and to engage over a snagged lure on such line, a longitudinal line guide eccentrically mounted within said body comprising a helical coil secured at one end only to said side wall, said guide coil having a forward end spaced from the forward end of the body, and gravity actuated lure engaging means mounted within the forward end of the body, said helical coil being located closer to one side of said body than to an opposite side of the body, and a retrieving line secured to the rearward end of the body at said opposite side of the body.

References Cited in the file of this patent

UNITED STATES PATENTS

| 720,136 | Halliran | Feb. 10, 1903 |
| 1,042,630 | Wetmore | Oct. 29, 1912 |
| 2,344,838 | Van Sickle | Mar. 21, 1944 |
| 2,472,207 | Gundel | June 7, 1949 |
| 2,482,716 | Noelcke | Sept. 20, 1949 |
| 2,488,996 | Thompson | Nov. 22, 1949 |
| 2,593,716 | Allen | Apr. 22, 1952 |
| 2,627,691 | Bress | Feb. 10, 1953 |

FOREIGN PATENTS

| 617,392 | Great Britain | Feb. 4, 1949 |